(12) United States Patent
Schaefer et al.

(10) Patent No.: US 8,981,764 B2
(45) Date of Patent: Mar. 17, 2015

(54) ROLLING BEARING SENSOR WITH ANTI-ROTATIONAL MEANS

(75) Inventors: Marc-Andre Schaefer, Uechtelhausen (DE); Jens Heim, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/880,629

(22) PCT Filed: Jul. 4, 2011

(86) PCT No.: PCT/EP2011/061208
§ 371 (c)(1),
(2), (4) Date: Jun. 28, 2013

(87) PCT Pub. No.: WO2012/055589
PCT Pub. Date: May 3, 2012

(65) Prior Publication Data
US 2013/0272637 A1    Oct. 17, 2013

(30) Foreign Application Priority Data

Oct. 25, 2010   (DE) .......................... 10 2010 049 552

(51) Int. Cl.
*G01P 3/54*     (2006.01)
*F16C 19/52*    (2006.01)
(Continued)

(52) U.S. Cl.
CPC ................. *F16C 19/52* (2013.01); *G01P 3/443* (2013.01); *G01D 11/245* (2013.01); *G01P 1/026* (2013.01); *F16C 41/007* (2013.01)
USPC ................. 324/173; 324/207.11; 324/207.13; 324/207.15; 324/207.16; 324/207.17; 324/207.22; 324/207.25; 324/160; 324/166; 324/200; 73/431; 248/200; 384/446; 384/448

(58) Field of Classification Search
CPC ......... G01P 3/443; G01P 1/026; G01P 13/04; F16C 13/02; F16C 33/76; F16C 33/7886; G01H 1/003; B60C 23/0408
USPC .................... 324/160, 166, 173, 200, 207.11, 324/207.13, 207.15–207.17, 207.22, 324/207.25; 73/431; 248/200; 384/446, 448
See application file for complete search history.

(56) References Cited

U.S. PATENT DOCUMENTS 5,131,763 A *  7/1992  Caron ........................... 384/448
5,293,124 A *  3/1994  Caillaut et al. ................. 324/173
(Continued)

FOREIGN PATENT DOCUMENTS

DE          2430732       6/1974
DE          3613135       10/1987
(Continued)

*Primary Examiner* — Patrick Assouad
*Assistant Examiner* — Sean Curtis
(74) *Attorney, Agent, or Firm* — Simpson & Simpson, PLLC

(57) ABSTRACT

A rolling bearing sensor, especially a rotational speed sensor, having a housing and a signal pick-up which is arranged in the housing in a manner secured against rotation and is arranged, with the housing, in a stationary receptacle in a stationary part of a rolling bearing or in a stationary component adjoining a rolling bearing, for example, an axle journal, where the housing has an outer design via which the rolling bearing sensor in the receptacle is secured against rotation in a form-fitting manner. The sensor may have a groove which runs in the axial direction and interacts with a screw or a projection. Alternatively, a securing element which predefines a defined angular position may be pushed onto the sensor.

14 Claims, 3 Drawing Sheets

(51) Int. Cl.
  *G01P 3/44* (2006.01)
  *G01D 11/24* (2006.01)
  *G01P 1/02* (2006.01)
  *F16C 41/00* (2006.01)

(56) References Cited

U.S. PATENT DOCUMENTS

| | | | | |
|---|---|---|---|---|
| 5,372,435 A | * | 12/1994 | Genero et al. | 384/448 |
| 5,575,568 A | * | 11/1996 | Rigaux et al. | 384/448 |
| 5,640,087 A | * | 6/1997 | Alff | 324/173 |
| 5,663,640 A | * | 9/1997 | Sakamoto | 324/173 |
| 5,677,624 A | * | 10/1997 | Miyazaki et al. | 324/173 |
| 5,714,880 A | * | 2/1998 | Miyazaki et al. | 324/173 |
| 5,852,361 A | * | 12/1998 | Ouchi et al. | 324/174 |
| 5,942,891 A | * | 8/1999 | Miyazaki et al. | 324/173 |
| 5,998,987 A | * | 12/1999 | Ikeuchi et al. | 324/173 |
| 6,094,046 A | * | 7/2000 | Message et al. | 324/173 |
| 6,123,301 A | * | 9/2000 | Schroeder et al. | 248/200 |
| 6,127,819 A | * | 10/2000 | Ouchi | 324/173 |
| 6,186,667 B1 | * | 2/2001 | Nakamura et al. | 384/448 |
| 6,209,389 B1 | * | 4/2001 | Sakamoto et al. | 73/115.08 |
| 6,231,241 B1 | * | 5/2001 | Ohkuma | 384/448 |
| 6,328,476 B2 | * | 12/2001 | Nakamura et al. | 384/448 |
| 6,695,483 B2 | * | 2/2004 | Sakatani et al. | 384/448 |
| 6,702,470 B2 | * | 3/2004 | Beauprez | 384/448 |
| 6,830,379 B2 | * | 12/2004 | Morita et al. | 384/448 |
| 6,916,118 B2 | * | 7/2005 | Ito | 384/448 |
| 6,926,445 B2 | * | 8/2005 | Sato et al. | 384/448 |
| 6,948,856 B2 | * | 9/2005 | Takizawa et al. | 384/448 |
| 7,014,368 B2 | * | 3/2006 | Morita et al. | 384/448 |
| 7,018,105 B2 | * | 3/2006 | Oka | 384/448 |
| 7,241,053 B2 | * | 7/2007 | Sato et al. | 384/448 |
| 7,290,938 B2 | * | 11/2007 | Aoki et al. | 384/448 |
| 7,481,583 B2 | * | 1/2009 | Aoki et al. | 384/448 |
| 7,610,998 B2 | * | 11/2009 | Baumgartner et al. | 188/72.9 |
| 7,798,723 B2 | * | 9/2010 | Ishii et al. | 384/448 |
| 8,221,001 B2 | * | 7/2012 | Morita et al. | 384/448 |
| 2002/0054719 A1 | * | 5/2002 | Takizawa et al. | 384/448 |
| 2002/0141673 A1 | * | 10/2002 | Ito et al. | 384/448 |
| 2003/0048962 A1 | * | 3/2003 | Sato et al. | 384/448 |
| 2003/0091253 A1 | * | 5/2003 | Morita et al. | 384/448 |
| 2004/0126043 A1 | * | 7/2004 | Ito | 384/448 |
| 2005/0031239 A1 | * | 2/2005 | Aoki et al. | 384/448 |
| 2005/0232523 A1 | * | 10/2005 | Sato et al. | 384/448 |
| 2005/0259903 A1 | * | 11/2005 | Takizawa et al. | 384/448 |
| 2006/0039639 A1 | * | 2/2006 | Aoki et al. | 384/448 |
| 2006/0110086 A1 | * | 5/2006 | Morita et al. | 384/448 |
| 2006/0277985 A1 | * | 12/2006 | Faetanini | 73/121 |
| 2008/0044119 A1 | * | 2/2008 | Aoki et al. | 384/448 |
| 2008/0101740 A1 | * | 5/2008 | Aoki et al. | 384/446 |
| 2008/0118195 A1 | * | 5/2008 | Ishikawa et al. | 384/448 |
| 2008/0202235 A1 | * | 8/2008 | Laps et al. | 73/431 |
| 2008/0205806 A1 | * | 8/2008 | Clark | 384/448 |
| 2011/0026867 A1 | * | 2/2011 | Hamada et al. | 384/571 |
| 2012/0099811 A1 | * | 4/2012 | Ito | 384/448 |

FOREIGN PATENT DOCUMENTS

| | | |
|---|---|---|
| DE | 69111879 | 5/1996 |
| GB | 1442015 | 7/1976 |

* cited by examiner

ROLLING BEARING SENSOR WITH ANTI-ROTATIONAL MEANS

CROSS-REFERENCE TO RELATED APPLICATIONS

This application is the U.S. national stage application pursuant to 35 U.S.C. §371 of International Patent Application No. PCT/EP2011/061208 filed Jul. 4, 2011 which claims priority from German Patent Application No. 10 2010 049 552.2 filed Oct. 25, 2010, which applications are incorporated herein by reference to their entireties.

FIELD OF THE INVENTION

The invention relates to a roller bearing sensor, a roller bearing with a roller bearing sensor and an arrangement of a roller bearing sensor.

BACKGROUND OF THE INVENTION

In a number of roller bearing applications, it is necessary to arrange a sensor in a correct position and alignment with respect to a signal transmitter and then to fasten it. Especially revolutions per minute (rpm) sensors that interact with the signal transmitter that is fastened on a rotating part of the roller bearing can only function with a specific detection distance between sensor and signal sender.

For example, in wheel bearings in motor vehicles, so-called rpm sensors are used for anti-lock braking systems in which a subsequent deviation from the optimal detection distance can lead to a signal loss that limits the function of the anti-lock braking system or even suppresses it. The rpm sensors are mostly based on magnetic effects, e.g., the Hall effect, the magnetorestrictive effect or induction. However, similar problems exist in roller bearings in the aviation industry, e.g., roller bearings for jet engines, or even in roller bearings for rolling mills and paper-making machines.

On the one hand, the fastening must be secure enough in order to prevent a subsequent position change or an incorrect fastening during the sensor installation. On the other, the fastening should have few separate components and be designed simply, in order to keep the process cost-efficient.

A sensor for an angular ball bearing is known from U.S. Pat. No. 5,640,087, in which the sensor is mounted in a fixed flange on the stub axle. The housing of the sensor has a spring element, which can be loaded in a radial direction, with a latching tab. This latching tab is provided for engagement in a groove, which determines the axial position of the sensor. When it snaps in, it is possible to recognize that the sensor is arranged in the correct position. After that, there is an essentially disk-shaped fastening element that is fastened with axial positive connection to the sensor by means of a screw on the fixed flange.

A revolution per minute (rpm) sensor for an angular ball bearing is known from German Reference 69111879 T5 that is mounted in a fastening flange of the wheel bearing, whereby the fastening flange forms a part of the fixed stub axle.

BRIEF SUMMARY OF THE INVENTION

The object of the invention is to produce an improved roller bearing sensor, an improved roller bearing with a roller bearing sensor and an improved mounting of a roller bearing sensor, which makes possible a continuous and reliable sensing of roller bearing-related variables, even with high kinematic forces.

To achieve this object, a roller bearing sensor with a housing and a signal pickup mounted in the housing with anti-rotation locking, which with the housing is mounted in a fixed retainer in a fixed part of a roller bearing or in a fixed component adjacent to the roller bearing, is suggested, whereby the housing has an outer shaping by means of which the roller bearing sensor is secured with form fit against rotation in the retainer. Because of the solution suggested, the roller bearing sensor is held in the retainer in a defined position continuously, even with high dynamic forces so sensing the variables by means of the signal pickup mounted with anti-rotation locking in the housing occurs reliably and continuously without the danger of an unintended position change involving a measurement falsification of the signal pickup. The invention also makes possible a preferred use of active sensors that must be precisely positioned and aligned for optimal signal recording.

Further, it is suggested that the shaping is formed by a groove running in the outer wall of the housing in the installation direction of the roller bearing sensor. The groove thus serves, on the one hand, as an anti-rotation locking for the roller bearing sensor and, on the other, it can also be used for guiding the roller bearing sensor during the assembly process.

It is also suggested that the housing is formed of a thin-walled metal part and the shaping is implemented by a plastic deformation of the metal part. Plastic forming processes, e.g., pressing or deep drawing, are cost-effective manufacturing processes suitable for large production series and because of the use of a thin-walled metal part a housing with adequate form stability is then made possible for absorbing corresponding forces for securing the roller bearing sensor in the predetermined alignment.

Alternatively, the housing can also be designed as a plastic injection molded part, which also makes possible a very cost-effective manufacturing of the roller bearing sensor and in addition the shaping can also be formed at the same time as the housing manufacturing so an additional forming process of the housing for manufacturing the shaping can be eliminated.

Furthermore, it is suggested that the shaping is formed by a securing element that is connected so that it cannot rotate with the housing on a fixed part of the roller bearing or is supported on the adjacent component. Because of the use of the suggested securing element, a solution can be implemented in which the roller bearing sensor with the housing can be supported not directly in or on the retainer.

In addition to achieving the object, a roller bearing is suggested with a roller bearing sensor, in which the roller bearing sensor is secured against rotation by means of a securing part supported on the shaping arranged on the roller bearing. For example, screws or bolts can be used that are mounted in corresponding holes on the roller bearing and are supported with one free end on the shaping of the roller bearing sensor housing for securing the roller bearing.

Moreover, to achieve the object, a retainer of a roller bearing sensor with a housing and a signal pickup mounted with anti-rotation locking in the housing, which is mounted with the housing in a fixed retainer in a fixed part of a roller bearing or in a fixed component adjacent to a roller bearing, is suggested, in which the housing has an outer shaping by which the roller bearing sensor is secured against rotation in the retainer with form fit.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
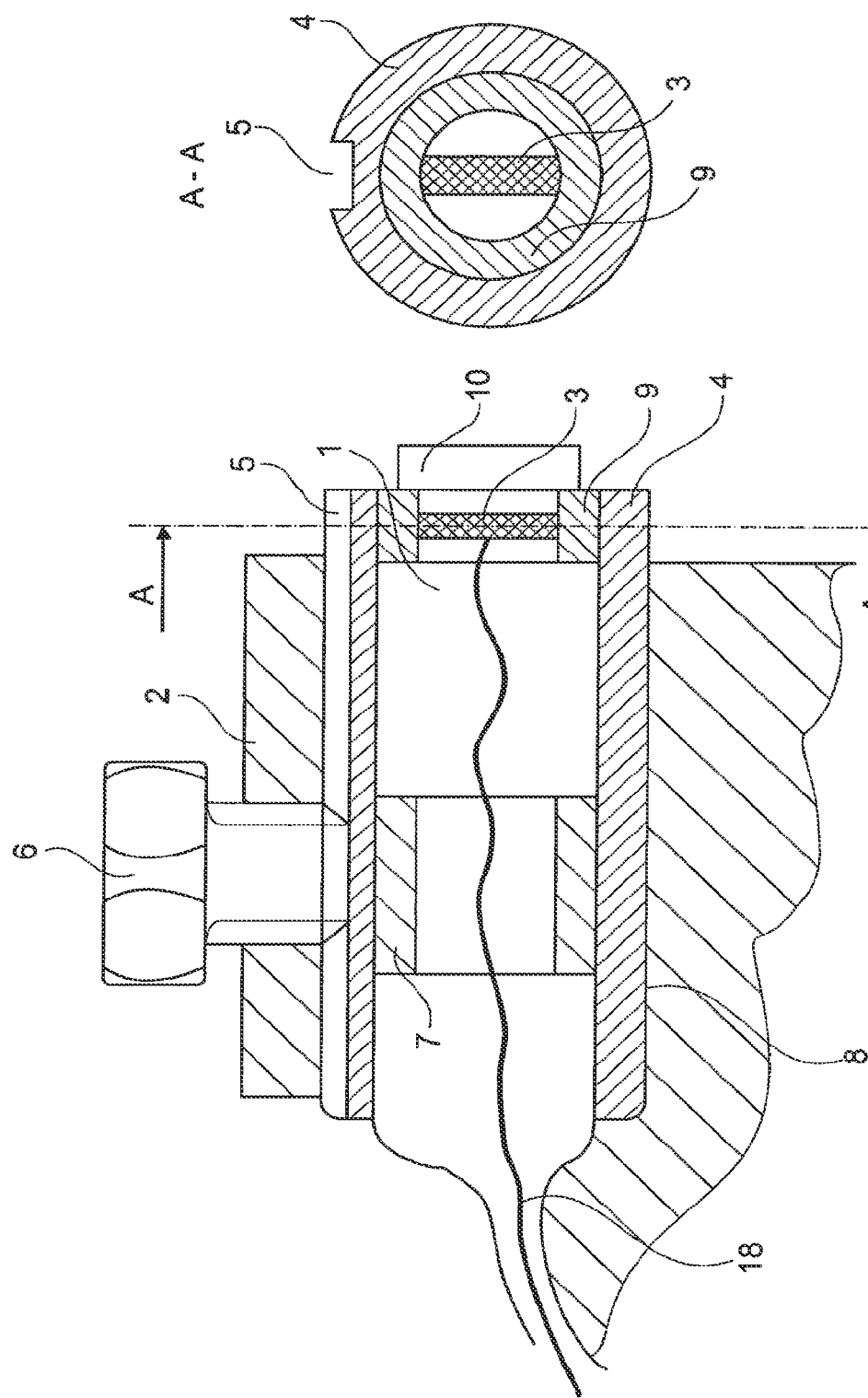
FIG. 1 is a roller bearing sensor with a housing having a groove and a screw engaging in the groove.

In FIG. 1, a roller bearing sensor 1 in a fixed part of a roller bearing 2 can be seen in cross section and in cross section direction A-A. The roller bearing sensor 1 can also alternatively be mounted in a fixed component adjacent to the roller bearing 2, e.g., a stub axle. It is only important that the roller bearing sensor 1 is aligned on a moving part of a roller bearing 2, preferably on a bearing ring, in such a way that the roller bearing sensor 1 can sense the variable to be sensed, e.g., the rotation speed, radial or axial movements of the moving part or slot widths with respect to the fixed part.

The roller bearing sensor 1 is mounted with a housing 4 in a retainer 8 of the roller bearing 2 and, on its face side, has a signal pickup 3 fixed in position by a holding part 9, which is electrically connected by way of an electric wire 18 to an external control and/or evaluating unit. The signal pickup 3 is additionally protected from outer mechanical effects on the face side by a cover element 10, or even spacers.

On its outside, the housing 4 has a groove 5 that extends into the retainer 8 in longitudinal direction of the housing 4 in the direction of the roller bearing sensor 1 plug-in direction. In addition, on the fixed part of the roller bearing 2 a securing part 6 is provided in the form of a screw screwed in from the outside, which extends into the retainer 8 and while doing so engages into the groove 5 of the housing 4 and thereby secures it against rotation around its longitudinal axis. So that the force exerted by the securing part 6 does not disadvantageously deform the housing, a ring-shaped support element 7 is additionally provided on the inside of the housing 4.

The housing 4 can be designed, e.g., as a plastic injection molded part so the groove can be formed simultaneously during the forming process that takes place during the injection procedure. Alternatively, the housing 4 can also be manufactured of a tubular metal part and the groove 5 can be manufactured, e.g., by a special machining process.

Figure 2:
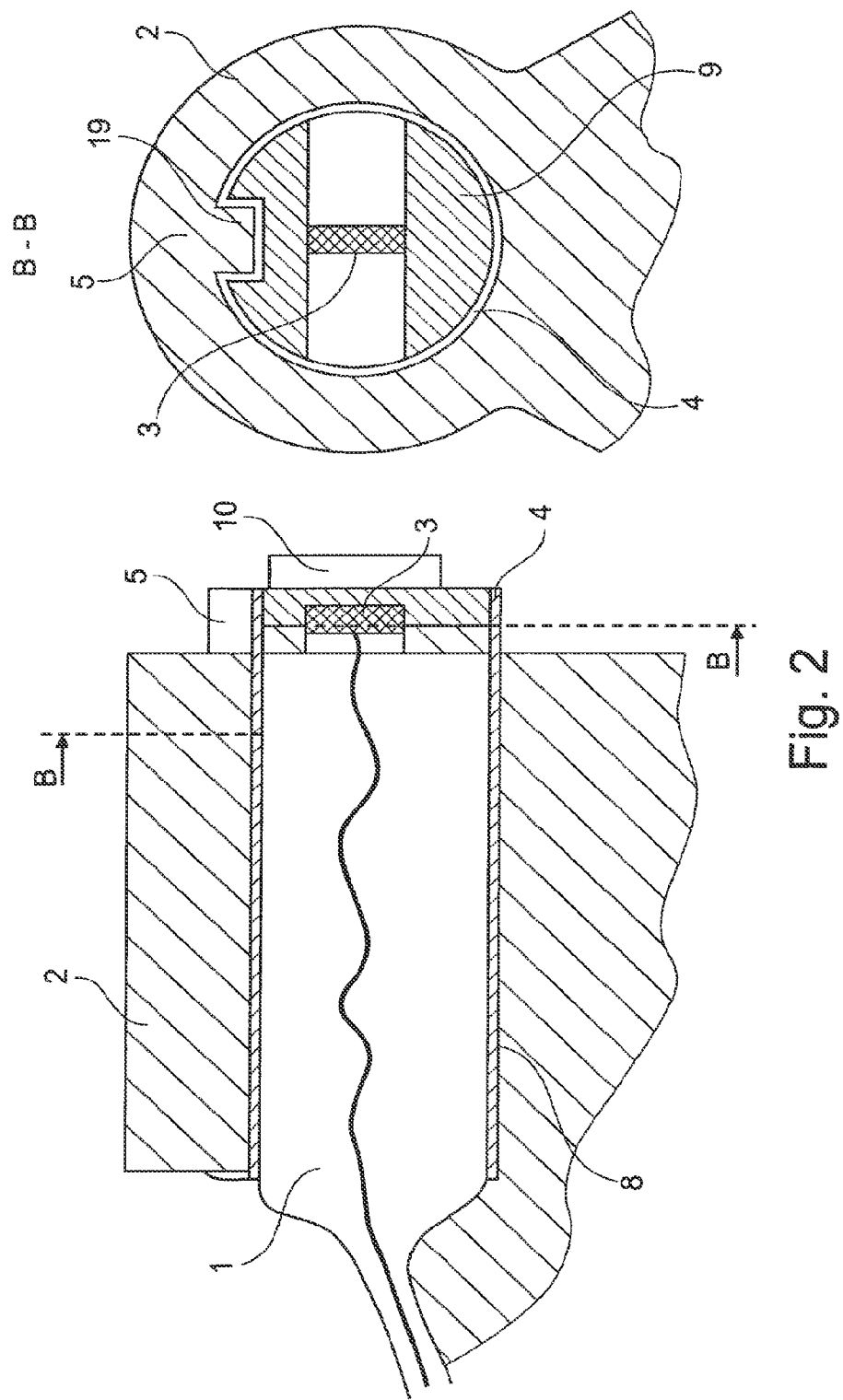
FIG. 2 is a roller bearing sensor with a housing having a groove and a projection extending into the groove mounted on the retainer.

FIG. 2 shows a slightly modified embodiment of the invention in cross section and in cross section direction B-B in which the housing 4 is formed by a thin-walled metal part with an essentially consistent wall thickness. Groove 5 is manufactured using a cost-effective plastic forming process of the housing 4, whereby because of the deformability of the metal part, the groove 5 and the housing 4 can also be dimensioned in such a way that the housing 4 can additionally be slightly deformed during installation into the retainer 8 and/or is then held in the retainer 8 with press fit.

On the inner wall of the retainer 8, a projection 19 is provided that extends inward, which extends into the groove 5 and thereby secures the housing 4 and the roller bearing sensor 1 as a whole against rotation. During the installation, the projection 19 also forms a guide for the plug-in movement of the roller bearing sensor 1 and for this purpose is designed as an elongated tab. As can be seen in the cross section representation, the signal pickup 3 in the housing 4 is held in a form-fitting holding part 9 fixed in position so it is secured in the circumference direction with respect to the housing so the signal pickup 3 is fixed in position by the holding part 9 and by the alignment with respect to the fixed part of the roller bearing 2 of the housing 4 by way of the groove 5. The form-fitting connection between the signal pickup 3, the holding part 9, the housing 4 and the fixed part of the roller bearing 2 is designed in such a way that the signal pickup 3 has an alignment that makes possible the greatest possible signal change when there is a change of the variable to be sensed.

Figure 3:
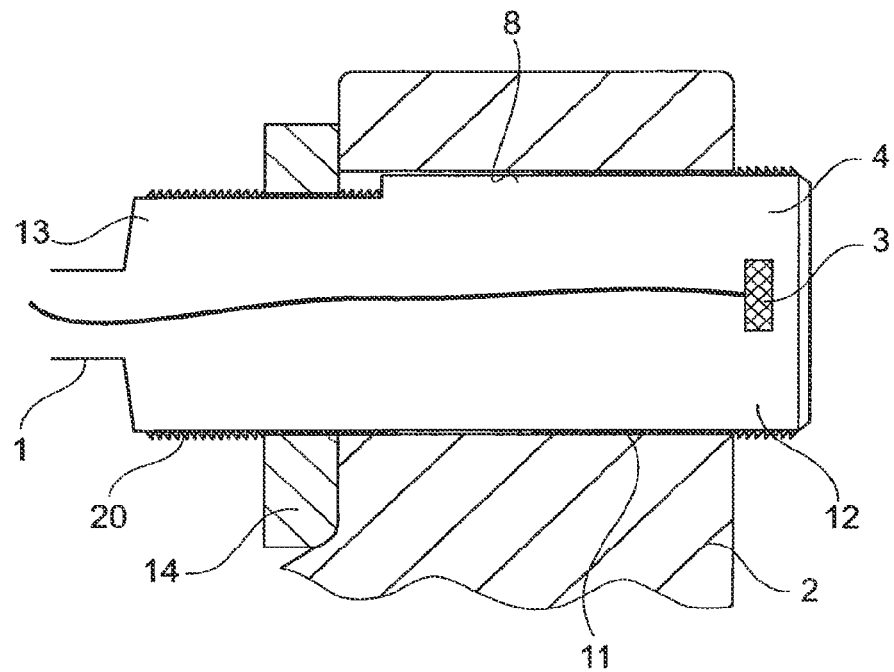
FIG. 3 is a roller bearing sensor with a securing element supported on the roller bearing; and, FIG. 4 is a securing element.
Figure 4:
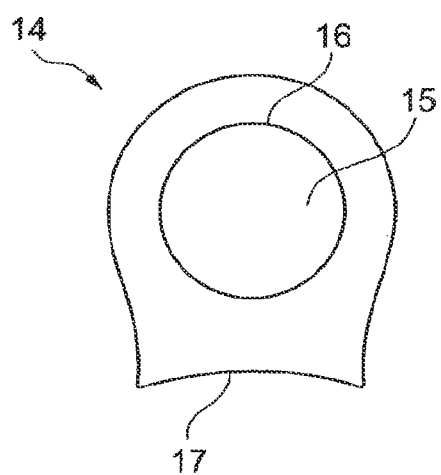

FIG. 3 shows another embodiment of the invention, in which the housing 4 of the roller bearing sensor 1 has a first cylindrical section 12 and a second section 13, each of which has a profile 11 and 20, respectively arranged on the outside. The profiles 11 and/or 20 are formed of teeth that can be pressed down, which allows the parts to be slid in or out and blocks a movement of the parts in the respective opposite direction. The retainer 8 in the fixed part of the roller bearing sensor 1 is designed as a round hole, into which the roller bearing sensor 1 can be introduced with a first section 12 during the assembly, at first in different angular directions with respect to its longitudinal axis. The outer shaping for fixing the position of the roller bearing sensor 1 is implemented by a flat section of the second section 13 in this case. After the introduction of the roller bearing sensor 1, its alignment is calibrated by mounting a securing element 14 on the second section 13. The securing element 14, as can also be seen in FIG. 4, has an opening 15 with a one-sided flat section 16, which makes it possible to slide the securing element 14 on the second section 13 in only in one angular direction. The securing element 14 then supports itself in the aligned position by way of a support surface 17 on the fixed part of the roller bearing 2. Because of the form-fitting connection of the securing element 14 by way of the support surface 17 on the fixed part and the form-fitting connection over the flat section 16 to the housing 4, the housing 4 and thus also the signal pickup 3 arranged in the housing 4 is mounted and aligned with respect to the fixed part of the roller bearing 2 and to the moving part of the roller bearing 2.

The profiles 11 and 20 thus cause a form-fitting and/or frictional connection between the housing 4 and the fixed part of the roller bearing 2 and, on the other hand, between the housing 4 and securing element 14.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 Roller bearing sensor
2 Roller bearing
3 Signal pickup
4 Housing
5 Groove
6 Securing part
7 Support element
8 Retainer
8 Holding part
9 Cover element
10 Profile
11 First section
13 Second section
14 Securing element
15 Opening
16 Flat section
17 Support surface
18 Electric wire
19 Projection
20 Profile

What is claimed is:

1. A roller bearing sensor secured to a non-rotatable portion of a roller bearing, comprising:
    a retainer secured to said non-rotatable portion of said roller bearing;
    a housing mounted in said retainer;
    a holding part arranged within said housing and at least partially co-planar with said housing; and,
    a signal pickup mounted with anti-rotation locking within said housing and said holding part, said signal pickup arranged at least partially co-planar with said housing and said holding part and said signal pickup positioned a distance from a rotatable portion of said roller bearing,
    wherein said housing has an outer shaping by which the roller bearing sensor is secured against turning with form fit in the retainer.

2. The roller bearing sensor recited in claim 1, wherein said shaping is formed by a groove running in an outer wall of said housing in a mounting direction of said roller bearing sensor.

3. The roller bearing sensor recited in claim 1, wherein said housing is formed of a thin-walled metal part and the shaping is implemented by a plastic deformation of the metal part.

4. The roller bearing sensor recited in claim 1, wherein said housing is designed as a plastic injection molded part.

5. The roller bearing sensor recited in claim 1, wherein the shaping is formed by a securing element connected to said housing so it cannot rotate, supported on the fixed part of the roller bearing.

6. The roller bearing with a roller bearing sensor recited in claim 1, wherein the roller bearing sensor is secured against rotation by means of a securing part supported on the shaping.

7. An arrangement of a roller bearing sensor comprising:
    a retainer secured to a fixed (part of a roller bearing;
    a housing mounted in said retainer;
    a holding part arranged within said housing and at least partially co-planar with said housing; and,
    a signal pickup locked against rotation mounted in the housing and said holding part, said signal pickup arranged at least partially co-planar with said housing and said holding part and said signal pickup arranged a distance from a rotatable part of the roller bearing;
    wherein the housing has an outer shaping by which the roller bearing sensor is secured against rotation with form fit in the retainer.

8. The arrangement of a roller bearing sensor recited in claim 7, wherein the roller bearing sensor is designed according to claim 1.

9. The arrangement of a roller bearing sensor recited in claim 7, wherein the roller bearing sensor is designed according to claim 2.

10. The arrangement of a roller bearing sensor recited in claim 7, wherein the roller bearing sensor is designed according to claim 3.

11. The arrangement of a roller bearing sensor recited in claim 7, wherein the roller bearing sensor is designed according to claim 4.

12. The arrangement of a roller bearing sensor recited in claim 7, wherein the roller bearing sensor is designed according to claim to 5.

13. A roller bearing sensor, comprising:
    a retainer secured to a fixed component adjacent to a roller bearing;
    a housing mounted in said retainer;
    a holding part arranged within said housing and at least partially co-planar with said housing; and,
    a signal pickup mounted with anti-rotation locking within said housing and said holding part, said signal pickup arranged at least partially co-planar with said housing and said holding part and said signal pickup positioned a distance from a rotatable portion of said roller bearing;
    wherein said housing has an outer shaping by which the roller bearing sensor is secured against turning with form fit in the retainer.

14. The roller bearing sensor recited in claim 13, wherein the shaping is formed by a securing element connected to said housing so it cannot rotate, supported on the adjacent component.

* * * * *